(12) United States Patent
Kaplan et al.

(10) Patent No.: US 11,059,933 B2
(45) Date of Patent: Jul. 13, 2021

(54) ISOCYANATE-MODIFIED POLYESTER-EPOXIDE POLYMER COMPOSITIONS

(71) Applicant: STEPAN COMPANY, Northfield, IL (US)

(72) Inventors: Warren A. Kaplan, Libertyville, IL (US); Jennifer S. Westfall, Bethel Park, PA (US)

(73) Assignee: STEPAN COMPANY, Northfield, IL (US)

( * ) Notice: Subject to any disclaimer, the term of this patent is extended or adjusted under 35 U.S.C. 154(b) by 0 days.

(21) Appl. No.: 16/556,396

(22) Filed: Aug. 30, 2019

(65) Prior Publication Data

US 2019/0382521 A1 Dec. 19, 2019

Related U.S. Application Data

(63) Continuation of application No. PCT/US2017/045865, filed on Aug. 8, 2017.

(60) Provisional application No. 62/466,034, filed on Mar. 2, 2017.

(51) Int. Cl.
*C08G 18/42* (2006.01)
*C08G 18/16* (2006.01)
*C08G 18/58* (2006.01)
*C08G 18/76* (2006.01)
*C08L 75/04* (2006.01)
*C09D 175/08* (2006.01)

(52) U.S. Cl.
CPC ....... *C08G 18/4252* (2013.01); *C08G 18/166* (2013.01); *C08G 18/58* (2013.01); *C08G 18/76* (2013.01); *C08L 75/04* (2013.01); *C09D 175/08* (2013.01)

(58) Field of Classification Search
None
See application file for complete search history.

(56) References Cited

U.S. PATENT DOCUMENTS

| | | | |
|---|---|---|---|
| 3,404,018 A | 10/1968 | Hicks | |
| 3,621,074 A | 11/1971 | Siggel et al. | |
| 5,987,727 A * | 11/1999 | Shafik | B05D 7/16 156/196 |
| 9,169,418 B2 | 10/2015 | Sakane | |
| 2004/0072963 A1 | 4/2004 | Sakane | |
| 2009/0324957 A1 * | 12/2009 | Wilke | C08G 18/4063 428/413 |
| 2010/0041794 A1 | 2/2010 | Earls et al. | |
| 2010/0126664 A1 | 5/2010 | O'Brien | |
| 2011/0288204 A1 | 11/2011 | Grablowitz et al. | |
| 2016/0130393 A1 | 5/2016 | Liao et al. | |

FOREIGN PATENT DOCUMENTS

| | | |
|---|---|---|
| CN | 101358122 A | 2/2009 |
| CN | 104212405 A | 12/2014 |
| CN | 104745138 A | 7/2015 |
| EP | 1512705 A1 | 3/2005 |
| EP | 2325221 A1 | 5/2011 |
| JP | H0148928 B2 | 10/1989 |
| JP | H0364529 B2 | 10/1991 |
| JP | H05320556 A | 12/1993 |
| KR | 100726684 B1 | 6/2007 |
| RU | 2457220 C1 | 7/2012 |
| WO | 2014072515 A1 | 5/2014 |
| WO | 2015160468 A1 | 10/2015 |
| WO | 2016105722 A1 | 6/2016 |

OTHER PUBLICATIONS

Akkapeddi et al., "Chain Extension of Pet and Nylon in an Extruder", Polym. Prepr. (Am. Chem. Soc., Div. Polym. Chem.) 29 (1988) 567-569.

Anzures et al., "The Effect of Polyester Polyol Structure on the Reactivity of Photocurable Epoxide Systems", RadTech Eur. 95 Conf. Proc. 574-583.

Arnebold et al., "Covalent integration of differently structured polyester polyols improves the toughness and strength of cationically polymerized, amorphous epoxy networks", J. Appl. Polym. Sci. 133 (2016) 43986.

Blank et al., "Catalysis of the Epoxy-Carboxyl Reaction", J. Coat. Technol. 74 (2002) 33-41.

Crivello et al., "The Effects of Polyols As Chain Transfer Agents and Flexibilizers in Photoinitiated Cationic Polymerization", J. Radiat. Curing (1986) Oct., pp. 3-9.

Eaton, "Coating Crosslinking Reactions Using Cycloaliphatic Epoxides", Paint Coat. Ind. Jun. 1999, 76-80.

Haralabakopoulous et al., "Chain Extension of Poly(ethylene terephthalate) with Diepoxides by a Reactive Extrusion-Simulating Process", Polym. Prepr. (Am. Chem. Soc., Div. Polym. Chem.) 38 (1997) 168-169.

Harani et al., "Toughening of Epoxy Resin Using Hydroxyl-Terminated Polyesters", J. Appl. Polym. Sci. 71 (1999) 29-38.

Raj et al., "Studies on Glass Reinforced Composites based on modified Epoxy Resin and Acrylic Acid System", Int. J. Plast. Technol. 9 (2005) 451.

(Continued)

*Primary Examiner* — Megan McCulley
(74) *Attorney, Agent, or Firm* — Dilworth IP, LLC

(57) ABSTRACT

Isocyanate-modified polyester-epoxide polymer (i-PEEP) compositions are disclosed. The i-PEEP compositions comprise a reaction product of a polyepoxide compound, a polyisocyanate, and a polyester polyol composition. The ratio of epoxy equivalents to hydroxyl equivalents is within the range of 0.2 to 2. The i-PEEP index as defined herein is within the range of 100 to 200. The i-PEEP composition has a $T_g$ within the range of −30° C. to 35° C. Low- and elevated-temperature processes catalyzed by bases or Lewis acids for making the i-PEEP compositions are also disclosed. In a simple yet innovative approach, a new class of polymers useful for coatings, elastomers, adhesives, sealants, and other valuable products is assembled from readily available starting materials without reliance on the polyamines typically used to cure epoxy systems.

25 Claims, No Drawings

(56) References Cited

OTHER PUBLICATIONS

Ratna et al., "Thermal and Mechanical Properties of a Hydroxyl-functional Dendritic Hyperbranched Polymer and Trifunctional Epoxy Resin Blends", Polym. Eng. Sci. 41 (2001) 1815.
Shalati et al., "High performance accelerated all acrylic coatings Kinetics and mechanistic aspects of non-isocyanate coatings", Prog. Org. Coat. 48 (2003) 236.
Shecter et al., "Glycidyl Ether Reactions with Alcohols, Phenols, Carboxylic Acids, and Acid Anhydrides", Ind. Eng. Chem. 48 (1956) 86.
Spyrou, "Radiation initiated cationic polymerization with", Prog. Org. Coat. 43 (2001) 25.
Tomuta et al., "New chemically reworkable epoxy coatings obtained by the addition of polyesters with star topologies to diglycidyl ether of bisphenol A resins", Prog. Org. Coat. 76 (2013) 1616.
Worzakowska, "Synthesis, Characterization, Thermal, and Viscoelastic Properties of an Unsaturated Epoxy Polyester Cured with Different Hardeners", J. Appl. Polym. Sci. 110 (2008) 3582.
Wu et al., "Kinetic modelling of crosslinking reactions for cycloaliphatic epoxides with hydroxyl- and carboxyl-functionalized acrylic copolymers: 1. pH and temperature effects", Polymer 39 (1999) 5747.
Xu et al., "Curing behavior and toughening performance of epoxy resins containing hyperbranched polyester", Polym. Adv. Technol. 15 (2004) 639.
PCT International Search Report and Written Opinion of the International Searching Authority dated Oct. 23, 2017 in corresponding Application No. PCT/US2017/045860, 8 pages.
PCT International Search Report and Written Opinion of the International Searching Authority dated Oct. 20, 2017 in corresponding Application No. PCT/US2017/045865, 9 pages.
PCT International Search Report and Written Opinion of the International Searching Authority dated Nov. 23, 2017 in corresponding Application No. PCT/US2017/045867, 8 pages.

\* cited by examiner

ISOCYANATE-MODIFIED POLYESTER-EPOXIDE POLYMER COMPOSITIONS

FIELD OF THE INVENTION

The invention relates to isocyanate-modified polyester-epoxide polymer (i-PEEP) compositions and their use in coatings, elastomers, adhesives, and other applications.

BACKGROUND OF THE INVENTION

Epoxy-functional compositions have long been known as building blocks for making epoxy resins. Reaction products of bisphenols and epichlorohydrin, for instance, are mainstays of the epoxy resin industry and have been sold for years as EPON® resins (Hexion Specialty Chemicals). Epoxy resins react with "hardeners" or other crosslinkers—usually polyamines, polycarboxylic acids, or polythiols—to give cured, high polymers for adhesives and other end-use applications.

Epoxy resins are also commonly reacted with acrylic or methacrylic acids to produce "vinyl ester" resins. Vinyl esters have hydroxyl and acrylic functionality and are viewed as a "high end" variety of unsaturated polyester resin. Like unsaturated polyester resins, vinyl ester resins cure with styrene and a free-radical initiator, but they can give plastics with properties that cannot be easily achieved with general-purpose unsaturated polyester resins.

Hydroxy-terminated polyester polyols occupy yet another distinct realm. These are aliphatic or aromatic intermediates that react with polyisocyanates to give polyurethanes. Aromatic polyester polyols are often used to make rigid polyurethane foams for building products, while aliphatic polyester polyols are more commonly found in polyurethane coatings or elastomer applications, such as shoe soles.

Although hydroxy-functional materials can at least in theory be used to cure epoxy resins, conventional wisdom holds that polyamines, which will react much more quickly with the epoxide groups, are better suited for this purpose. Among polyesters that have been reacted with epoxy resins, the vast majority are terminated with carboxylic acid groups.

Consequently, despite the long-standing availability of epoxy resins and hydroxy-terminated polyester polyols, relatively little has been reported about the possible benefits of these reaction products. In limited instances, when polyester polyols have been reacted with epoxy resins, the polyols have exceptionally high hydroxyl functionality (>4) or hydroxyl number (>500 mg KOH/g), as in the case of dendrimeric or hyper-branched polyester polyols. In other variations, the molar ratio of epoxide reactive groups to hydroxyl reactive groups exceeds about 4:1.

A challenge with most epoxy-based products is in making products having desirable flexibility at low cost while preserving other important properties. Most epoxy-based products have relatively high glass-transition temperatures ($T_g$>50° C.) and low ultimate elongations (<10%).

There are some reports of products made in which a polyol, a polyisocyanate, and a polyepoxide are used as reactants. In some cases, the polyol is not a polyester polyol (see, e.g., WO 2014/072515). In other instances, an intermediate is made that must be further reacted with a cross-linking agent or other materials to make the final coating or other finished product (see, e.g., CN 104745138, CN 104212405, JP 03064529, and KR 726684). Some references teach to react the polyester polyol, polyisocyanate, and polyepoxide in multiple steps rather than in a single step (see, e.g., RU 2457220 and CN 101358122, polyol reaction with epoxy resin, followed by reaction with a polyisocyanate; and JP 01048928 an KR 726684, polyol reaction with a polyisocyanate, followed by reaction with an epoxy resin). In some instances, elevated temperature conditions are also employed (see, e.g., RU 2457220 and CN 101358122).

Previously, we prepared polyester-epoxide polymer ("PEEP") compositions that are reaction products of a polyepoxide compound and a polyol composition. We found that well-known building blocks drawn from different polymer technologies (urethane, epoxy, UPR) could be assembled to give a new class of polymers that are useful for coatings, elastomers, adhesives, sealants, and other valuable products. The PEEP compositions retain many of the benefits of traditional epoxide polymer products, but they have increased elongation and lower $T_g$.

The industry would benefit from the availability of additional epoxy-based products having increased elongation, lower $T_g$, values, and a favorable overall balance of properties in coatings, elastomers, and other similar products. Desirably, the products could be made using commercially available or readily made starting materials, conventional equipment, and ordinary process conditions. Preferably, the products could be tailored to meet targets for flexibility, impact resistance, hardness, stiffness, abrasion resistance, and other properties important to producers of coatings, adhesives, sealants, and elastomers. Ideally, products with excellent physical and mechanical properties could be realized without using polyamine curatives, which pose environmental and other challenges.

SUMMARY OF THE INVENTION

In one aspect, the invention relates to an isocyanate-modified polyester-epoxide polymer ("i-PEEP") composition. The i-PEEP composition comprises a reaction product of a polyepoxide compound, a polyisocyanate, and a polyol composition. The polyepoxide compound has an equivalent weight within the range of 125 to 250 g/eq. The polyisocyanate has an average NCO functionality within the range of 2.0 to 3.0. The polyol composition comprises a polyester polyol having a hydroxyl value within the range of 50 to 400 mg KOH/g, an average hydroxyl functionality within the range of 1.5 to 4.0, and an acid number less than 5 mg KOH/g. The ratio of epoxy equivalents of the polyepoxide compound to hydroxyl equivalents of the polyol composition is within the range of 0.2 to 2. The i-PEEP index (defined hereinbelow) is within the range of 100 to 200. The i-PEEP composition has a glass-transition temperature as measured by differential scanning calorimetry within the range of −30° C. to 35° C.

The invention includes processes for making the i-PEEP compositions described above. One such process ("low-temperature process") for making the i-PEEP compositions comprises reacting, at a temperature within the range of 0° C. to 40° C. in the presence of a catalyst, a mixture comprising the polyepoxide compound, the polyisocyanate, and the polyol composition comprising a polyester polyol. The ratio of epoxy equivalents of the polyepoxide compound to hydroxyl equivalents of the polyol composition is within the range of 0.2 to 2, the i-PEEP index is within the range of 100 to 200, and the resulting i-PEEP composition has a $T_g$ within the range of −30° C. to 35° C. The catalyst for this process preferably comprises a Lewis acid compound. In a preferred aspect, the reaction is performed at room temperature.

An alternative process ("elevated-temperature process") comprises heating, at a temperature within the range of 40° C. to 100° C., optionally in the presence of a catalyst, a mixture comprising the polyepoxide compound, the polyisocyanate, and the polyol composition comprising a polyester polyol as described above. The ratio of epoxy equivalents of the polyepoxide compound to hydroxyl equivalents of the polyol composition is within the range of 0.2 to 2, the i-PEEP index is within the range of 100 to 200, and the PEEP composition has a $T_g$ within the range of −30° C. to 35° C. In some aspects, the heating is performed in the presence of a base or Lewis acid catalyst.

Either of the above-described processes can be followed by a post-cure. When a Lewis acid is used, the post-cure can be at room temperature or elevated (50° C. to 150° C.) temperature. When a base catalyst is used, an elevated temperature post-cure is desirable.

Well-known building blocks drawn from different polymer technologies (urethane, epoxy, UPR) can be assembled to give a new class of polymers ("i-PEEP" or "isocyanate-modified polyester-epoxide polymers") that are useful for coatings, elastomers, adhesives, sealants, and other valuable products. Surprisingly, these i-PEEP products fulfill industry needs without relying on polyamines, which are the most widely used epoxide hardeners. i-PEEP compositions retain many of the benefits of traditional epoxide polymer products, but they can have increased elongation, improved impact resistance, and variable or lower $T_g$. Excellent products can be made from commercially available or easily synthesized materials; there is no need to resort to specialty polyols such as dendrimers, use high epoxy to hydroxyl ratios, or rely on other esoteric means to achieve good results. The i-PEEP compositions are convenient to prepare in a one-step process, and similar stepwise approaches fail to deliver an acceptable product. Overall, the invention creates a new class of polymers and invites formulators to further explore this simple yet innovative approach to synthesizing thermoset polymers.

DETAILED DESCRIPTION OF THE INVENTION

In one aspect, the invention relates to an isocyanate-modified polyester-epoxide polymer (i-PEEP) composition that comprises a reaction product of a polyepoxide compound, a polyisocyanate, and a polyol composition comprising a polyester polyol.

The Polyepoxide Compound

Suitable polyepoxide compounds have two or more epoxide groups per molecule and an equivalent weight within the range of 125 to 250 g/eq., or in some aspects 150 to 240 g/eq. or 190 to 235 g/eq.

In preferred aspects, the polyepoxide compounds have an average of 2 to 4 epoxide groups per molecule ("average epoxide functionality"). In some aspects, the average epoxide functionality is from 2 to 3, 2.0 to 2.8, or about 2.

Some suitable polyepoxide compounds are commercially available, while others are readily synthesized from the reaction of epichlorohydrin and a suitable polyol or polyamine precursor, preferably from epichlorohydrin and an aromatic or cycloaliphatic polyol or polyamine.

In some aspects, the polyepoxide compound is a reaction product of a bisphenol (e.g., bisphenol A, bisphenol AP, bisphenol BP, bisphenol C, bisphenol F, bisphenol S, bisphenol Z, or the like) and epichlorohydrin. In other aspects, the polyepoxide compound is the reaction product of a hydrogenated bisphenol and epichlorohydrin. In other words, in some cases the polyepoxide compound is a "diglycidyl ether" of the bisphenol or hydrogenated bisphenol. Many of these materials are commercially available. For instance, suitable polyepoxide compounds include the EPON® 800 series of epoxy resins (products of Hexion Specialty Chemicals), mostly from bisphenol A or bisphenol F, such as EPON® resins 825, 826, 828, 830, 834, 862, and the like. Suitable bisphenol F-based resins also include EPALLOY® 8220, EPALLOY® 8230, and EPALLOY® 8240, products of CVC Thermoset Specialties.

Suitable epoxide compounds include bisphenol diglycidyl ethers in which the aromatic rings have been hydrogenated, such as EPALLOY® 5000 and EPALLOY® 5001, or modified with alkyl or functional groups, such as EPALLOY® 7200. Suitable polyepoxide compounds include di-, tri-, or tetrafunctional aromatic polyepoxides such as resorcinol diglycidyl ether (available as ERISYS™ RDGE from CVC Thermoset Specialties), the triglycidyl ether of tris(hydroxyphenyl)ethane (available, for instance, as EPALLOY® 9000), and the tetraglycidyl ether of m-xylenediamine (available as ERISYS™ GA 240). Suitable polyepoxide compounds also include aromatic and cycloaliphatic glycidyl esters, such as the diglycidyl ester of isophthalic acid, phthalic acid, or terephthalic acid and hydrogenated versions thereof, such as hexahydrophthalic acid diglycidyl ester (available, for instance, as EPALLOY® 5200).

In some aspects, the polyepoxide compound is an aliphatic diglycidyl ether, particularly aliphatic diglycidyl ethers having average epoxide functionalities of at least 2, preferably at least 3. Suitable aliphatic diglycidyl ethers include, for example, 1,4-butanediol diglycidyl ether, 1,4-cyclohexanediol diglycidyl ether, neopentyl glycol diglycidyl ether, ethylene glycol diglycidyl ether, 2-methyl-1,3-propanediol diglycidyl ether, 1,6-hexanediol diglycidyl ether, dipropylene glycol diglycidyl ether, glycerol triglycidyl ether, trimethylolpropane triglycidyl ether, pentaerythritol tetraglycidyl ether, and the like, and mixtures thereof. Suitable polyepoxide compounds of this type are easily made by reacting the polyols with excess epichlorohydrin; many are commercially available from CVC Thermoset Specialties under the ERISYS™ mark or from other suppliers.

Mixtures of various types of polyepoxide compounds can be used. In preferred aspects, the polyepoxide compound comprises at least 50 wt. %, at least 60 wt. %, or at least 75 wt. %, of an aromatic polyepoxide compound, a cycloaliphatic polyepoxide compound, or a combination thereof.

The polyepoxide compound is used in an amount such that the ratio of epoxy equivalents of the polyepoxide compound to hydroxyl equivalents of the polyol composition comprising a polyester polyol is within the range of 0.2 to 2. In other aspects, the ratio of epoxy to hydroxyl equivalents will range from 0.4 to 1.8, from 0.5 to 1.5, or from 0.8 to 1.2.

The amount of polyepoxide compound used can vary and will depend on many factors, including the nature of the polyepoxide compound, the nature and proportion of the polyol composition, the nature and proportion of the polyisocyanate, the desired stoichiometry, and other factors. In general, however, the amount of polyepoxide compound will be within the range of 5 to 60 wt. %, 10 to 50 wt. %, or 20 to 40 wt. %, based on the amount of i-PEEP composition.

The amounts of polyepoxide compound, polyisocyanate, and polyol composition are normally adjusted to achieve a particular i-PEEP index as is defined further below.

The Polyisocyanate

Suitable polyisocyanates are well known, and many are commercially available from Dow Chemical (under the PAPI™, ISONATE®, and VORONATE™ marks), Evonik (VESTANAT®), BASF (LUPRANATE®), Covestro (MONDUR® and DESMODUR®), Huntsman (RUBINATE®), and other suppliers of polyurethane intermediates. Polyisocyanates suitable for use have average NCO functionalities within the range of 2.0 to 3.0. The polyisocyanate can be aromatic or aliphatic. Aromatic polyisocyanates include, e.g., toluene diisocyanates (TDI), 4,4'-diphenylmethane diisocyanates (MDI), or polymeric diisocyanates (p-MDI), or the like. Aliphatic polyisocyanates include, e.g., hexamethylene diisocyanate (HDI), hydrogenated MDI, cyclohexane diisocyanate (CHDI), isophorone diisocyanate (IPDI), trimethyl or tetramethylhexamethylene diisocyanate (TMXDI), or the like. Polymeric MDIs having NCO functionalities within the range of 2.3 to 2.7 are preferred. Suitable polymeric MD's include, for instance, LUPRANATE® M-10 (average NCO functionality=2.3) and LUPRANATE® M-20 (average NCO functionality=2.7), products of BASF. Mixtures of different polyisocyanates can be used. Dimerized and trimerized polyisocyanates such as HDI dimer or HDI trimer can be used. In some aspects, aromatic polyisocyanates, e.g., p-MDI, are preferred.

The amount of polyisocyanate used can vary and will depend on many factors, including the nature and proportion of the polyepoxide compound, the nature and proportion of the polyol composition, the nature of the polyisocyanate, the desired stoichiometry, and other factors. In general, however, the amount of polyisocyanate will be within the range of 5 to 60 wt. %, 10 to 50 wt. %, or 20 to 40 wt. %, based on the amount of i-PEEP composition.

The amounts of polyisocyanate, polyepoxide compound, and polyol composition are normally adjusted to achieve a particular i-PEEP index as is defined further below.

The Polyol Composition

The isocyanate-modified polyester-epoxide polymer composition comprises a reaction product of the polyepoxide compound, the polyisocyanate, and a polyol composition. The polyol composition comprises a polyester polyol.

Suitable polyester polyols are well known and include aromatic and aliphatic polyester polyols. These polyols are terminated with hydroxyl groups and generally have low acid numbers (i.e., below 5 mg KOH/g). Suitable polyester polyols are readily synthesized by condensation polymerization of dicarboxylic acids, esters, or anhydrides with low molecular weight diols, polyols, or their mixtures. Suitable dicarboxylic acids, esters, or anhydrides include, for example, phthalic anhydride, isophthalic acid, terephthalic acid, dimethyl terephthalate, trimellitic anhydride, maleic anhydride, succinic anhydride, succinic acid, dimethyl succinate, diethyl adipate, glutaric acid, adipic acid, sebacic acid, suberic acid, and the like, and combinations thereof. Suitable diols and polyols useful for making polyester polyols include, for example, ethylene glycol, propylene glycol, 2-methyl-1,3-propanediol, 1,4-butanediol, 1,6-hexanediol, diethylene glycol, dipropylene glycol, triethylene glycol, tripropylene glycol, neopentyl glycol, 1,4-cyclohexanedimethanol, glycerin, trimethylolpropane, trimethylolethane, pentaerythritol, and the like, and combinations thereof.

Many suitable polyester polyols for use herein are commercially available from Stepan Company and other polyol suppliers. Examples include the STEPANPOL® PS-, PC-, PD-, PH-, PHN-, PN-, and AA-series polyols, products of Stepan. Examples include STEPANPOL® PS-2402, STEPANPOL® PC 1028-210, and STEPANPOL® PS-3524 (aromatic polyester polyols) and STEPANPOL® PC-101-210, STEPANPOL® PC-102-210, STEPANPOL® PC 105-210, STEPANPOL® PC 107-210, and STEPANPOL® PC 1040-210 (aliphatic polyester polyols) and STEPANPOL® 1021-210 (an aliphatic/aromatic polyester polyol). Commercially available products include TE RATE® and TERRIN™ polyols from INVISTA, TEROL® polyols from Huntsman, LUPRAPHEN® polyols from BASF, DESMOPHEN® polyols from Covestro, FOMREZ® polyols from Chemtura, ISOEXTER™ and DIEXTER-G™ polyols from Coim, PIOTHANE® polyols from Panolam, and MILLESTER™ polyols from Polyurethane Specialties.

The polyol composition can include polyether polyols, polycarbonate polyols, or other kinds of polyols in addition to the polyester polyol. In general, the polyol composition comprises at least 50%, in some aspects at least 65%, in other aspects at least 80%, of one or more polyester polyols. In some aspects, the polyol composition will consist of or consist essentially of one or more polyester polyols.

In suitable polyol compositions, the polyester polyol will have a hydroxyl value within the range of 50 to 400 mg KOH/g. In some aspects, the polyester polyol will have a hydroxyl value within the range of 60 to 350 mg KOH/g, or within the range of 80 to 150 mg KOH/g.

The polyester polyols will have average hydroxyl functionalities within the range of 1.5 to 4.0. In some aspects, the polyester polyol will have an average hydroxyl functionality within the range of 1.8 to 3.8 or 2.0 to 3.5.

The polyester polyols have primarily hydroxyl end groups and a limited proportion of carboxylic acid end groups, and they consequently will have low acid numbers, i.e., less than 5 mg KOH/g. In some aspects, the polyester polyols will have acid numbers less than 3 mg KOH/g, less than 2 mg KOH/g, or less than 1 mg KOH/g.

As indicated earlier, the amount of polyol composition used will be an amount effective to give a ratio of epoxy equivalents of the polyepoxide compound to hydroxyl equivalents of the polyol composition within the range of 0.2 to 2, 0.4 to 1.8, 0.5 to 1.5, or 0.8 to 1.2.

The amount of polyol composition used can vary and will depend on many factors, including the nature and amount of the polyepoxide compound, the nature and amount of polyisocyanate, the nature of the polyol composition, the desired stoichiometry, and other factors. In general, however, the amount of polyol composition will be within the range of 5 to 60 wt. %, 10 to 50 wt. %, or 20 to 40 wt. %, based on the amount of i-PEEP composition.

i-PEEP Index

The amounts of polyepoxide compound, polyisocyanate, and polyol composition are adjusted to give an i-PEEP index within the range of 100 to 200, preferably 110 to 180, and in some aspects 135 to 165. By "i-PEEP index," we mean the amount given by 100×[equivalents of polyepoxide compound+equivalents of polyisocyanate]/equivalents of polyol.

Thus, for instance, a formulation of EPON® 828 (188 g, 1.0 eq.), LUPRANATE® M-10 (132 g, 1.0 eq.) and STEPANPOL® PC-101-210 (314 g, 1.2 eq.) would have a calculated i-PEEP index of 100×[1.0+1.0]/1.2=167.

i-PEEP Compositions

The reaction product of the polyepoxide compound, the polyisocyanate, and the polyol composition comprising a polyester polyol is an isocyanate-modified polyester-epoxide polymer, also described herein as an "i-PEEP" composition. The i-PEEP compositions are distinguishable from conventional epoxy or urethane products in having a unique balance of properties.

For instance, the i-PEEP compositions will have a relatively low glass-transition temperature ($T_g$), as measured by differential scanning calorimetry (DSC), within the range −30° C. to 35° C. In some aspects, the $T_g$ of the i-PEEP composition will be within the range of −20° C. to 30° C. or within the range of −5° C. to 30° C.

When compared with conventional epoxy products, the i-PEEP compositions can have increased ultimate elongations (i.e., "elongation at break," hereinafter simply "elongation"), particularly when the polyester polyol comprises recurring units of an aliphatic dicarboxylic acid such as adipic acid (see, e.g., Table 2, below). In some aspects, the i-PEEP compositions will have elongations (as measured by ASTM D412, Method A) of at least 30%, at least 40%, at least 60%, or at least 80%. In other aspects, the i-PEEP compositions will have elongations within the range of 30% to 500%, 45% to 300%, or 50% to 200%. i-PEEP compositions with relatively low elongations (<10%) and high stiffness can be produced with aromatic polyisocyanates (see, e.g., Table 1, below).

The i-PEEP compositions can include well-known additives such as surfactants, fillers, pigments, flame retardants, catalysts, viscosity modifiers, blowing agents, reactive diluents, and the like. The type and amount of additive used will depend on the requirements of the specific end-use application.

The i-PEEP compositions can be formulated as elastomers, microcellular elastomers, coatings, sealants, adhesives, and other products. Elastomers can be formulated to give a wide range of Shore A or Shore D hardness values. Typical hardness values will range from Shore A 70 to Shore A 96, or from Shore A 85 to Shore A 96, more typically Shore A 90 to Shore A 96.

Elastomers from i-PEEP compositions normally have increased total energy absorption ("T. E. A.") values as described hereinbelow when compared with those of conventional epoxy systems. The T. E. A. values will typically range from 10 to 500 lb·in./in.$^2$, 10 to 300 lb·in./in.$^2$, or 20 to 200 lb·in./in.$^2$. This is particularly true when the polyester polyol comprises recurring units of an aliphatic dicarboxylic acid (see Table 2).

In some aspects, coatings from the i-PEEP compositions exhibit good abrasion resistance compared with conventional epoxy systems, as reflected by Taber abrasion values less than 80 mg, less than 50 mg, less than 30 mg, or less than 20 mg when using wheel CS-17 under 1000 cycles at 1-kg load (see Tables 1 and 2).

In some aspects, particularly when the polyester polyol comprises recurring units of an aliphatic dicarboxylic acid, coatings from the i-PEEP compositions will have improved impact resistance compared with that of conventional epoxy systems (see, e.g., Table 2).

Processes for Making i-PEEP Compositions

1. Low-Temperature (0° C. to 40° C.) Process

In one aspect, the i-PEEP composition is produced in a single reaction step, preferably under ambient conditions. The process comprises reacting at a temperature within the range of 0° C. to 40° C., in the presence of a catalyst, a mixture comprising a polyepoxide compound, a polyisocyanate, and a polyol composition. The polyepoxide compound has an equivalent weight within the range of 125 to 250 g/eq. The polyol composition comprises a polyester polyol, wherein the polyester polyol has a hydroxyl value within the range of 50 to 400 mg KOH/g, an average hydroxyl functionality within the range of 1.5 to 4.0, and an acid number less than 5 mg KOH/g. The ratio of epoxy equivalents of the polyepoxide compound to hydroxyl equivalents of the polyol composition is within the range of 0.2 to 2. The i-PEEP index as defined herein is within the range of 100 to 200. The process produces an isocyanate-modified polyester-epoxide polymer composition having a glass-transition temperature as measured by differential scanning calorimetry within the range of −30° C. to 35° C.

The low-temperature process is performed in the presence of a catalyst. In a preferred aspect, the catalyst comprises a Lewis acid compound. Suitable Lewis acid compounds are electron pair acceptors and include, for example, aluminum chloride, aluminum bromide, zinc chloride, boron trichloride, boron trifluoride, tin tetrachloride, antimony pentachloride, and the like. Boron trifluoride and especially complexes of boron trifluoride with electron donors (e.g., ethers, alcohols, carboxylic acids, polyols, amines, sulfides) are preferred Lewis acid compounds. Examples include boron trifluoride etherate, boron trifluoride tetrahydrofuran complexes, boron trifluoride/alcohol complexes, boron trifluoride/acetic acid complexes, boron trifluoride/phosphoric acid complexes, boron trifluoride dimethyl sulfide complexes, boron trifluoride amine complexes, boron trifluoride polyol complexes, and the like, and combinations thereof. Lewis acid complexes with ethers, alcohols, polyols, and amines are particularly preferred. Suitable catalysts include, for instance, LEECURE® B-610 and LEECURE® B-1310, complexes of boron trifluoride with a Lewis base, products of Leepoxy Plastics, Inc.

In other aspects, the low-temperature process is performed in the presence of a base catalyst. Amine catalysts are preferred. In some preferred aspects, the amine catalyst comprises an amine compound, a polyamine, a polyamide, or a mixture thereof. Tertiary amines are preferred amine compounds. Suitable amine catalysts include, for example, 1,4-diazabicyclo[2.2.2]octane, 2,4,6-tris(dimethylaminomethyl)phenol (e.g., "DMP-30"), 4-dimethylaminopyridine, N,N-dimethylbenzylamine, (4-dimethylamino-methyl)phenol, (2-dimethylaminomethyl)phenol, 2,4,6-tris(4-morpholinylmethyl)phenol, 1,3,5-tris(3-(dimethylamino)propyl)hexahydro-s-triazine (e.g., POLYCAT® 41 from Air Products or JEFFCAT® TR-90 from Huntsman), and the like, and mixtures thereof.

The amount of Lewis acid or base catalyst needed for good curing will depend on many factors that are within the skilled person's discretion, including the nature of the polyepoxide compound, the nature of the polyisocyanate, the nature of the polyol composition, the particular catalyst selected, the kind of product (e.g., coating, adhesive, elastomer), the product dimensions, the reaction temperature, the desired pot life, and other factors. Generally, however, the amount of catalyst will be within the range of 0.01 to 10 wt. %, or 0.1 to 8 wt. %, or 1 to 5 wt. % based on the amount of i-PEEP composition produced.

The low-temperature process is performed at a temperature within the range of 0° C. to 40° C., or 10° C. to 30° C., or in many cases, at room temperature.

In some aspects, the polyol composition used to make the i-PEEP composition according to the low-temperature processes comprises an aromatic polyester polyol. In other aspects, the polyester polyol comprises recurring units of an aliphatic dicarboxylic acid; such polyester polyols are aliphatic or mixed aliphatic/aromatic polyester polyols.

In some aspects, the low-temperature process is performed at an i-PEEP index within the range of 105 to 180. In other aspects, the i-PEEP index is within the range of 125 to 165.

In some aspects, it may be desirable to post-cure a product made by the low-temperature process at room temperature or elevated temperature (e.g., 50° C. to 150° C.) with or without control of relative humidity to more rapidly achieve ultimate properties. In general, when a Lewis acid catalyst is used, the post-cure can be accomplished at either room temperature or elevated temperature. When a base catalyst is used, an elevated temperature post-cure is more desirable.

2. Elevated-Temperature (40° C. to 100° C.) Process

In another aspect, the invention relates to an elevated-temperature process for making an isocyanate-modified polyester-epoxide polymer composition. The process comprises heating, at a temperature within the range of 40° C. to 100° C., a mixture comprising a polyepoxide compound, a polyisocyanate, and a polyol composition comprising a polyester polyol, all as described above. The ratio of epoxy equivalents of the polyepoxide compound to hydroxyl equivalents of the polyol composition is within the range of 0.2 to 2. The i-PEEP index is within the range of 100 to 200. The resulting polyester-epoxide polymer composition has a glass-transition temperature as measured by differential scanning calorimetry within the range of −30° C. to 35° C.

The elevated-temperature process can be performed with or without a catalyst. Suitable catalysts include the Lewis acid catalysts and base catalysts described earlier.

In some aspects, the mixture comprising the polyepoxide compound, the polyol composition, and the polyisocyanate is heated at a temperature within the range of 60° C. to 90° C., or 65° C. to 80° C.

In some aspects, the polyol composition used to make the i-PEEP composition according to the elevated-temperature processes comprises an aromatic polyester polyol or a blend comprising an aromatic polyester polyol and a polyester polyol comprising recurring units of an aliphatic dicarboxylic acid.

In some aspects, it may be desirable to post-cure a product made by the elevated-temperature process at room temperature or elevated temperature (e.g., 50° C. to 150° C.) with or without control of relative humidity to more rapidly achieve ultimate properties. In general, when a Lewis acid catalyst is used, the post-cure can be accomplished at either room temperature or elevated temperature. When a base catalyst is used, an elevated temperature post-cure is more desirable.

The following examples merely illustrate the invention; the skilled person will recognize many variations that are within the spirit of the invention and scope of the claims.

Formulation Components:

EPON® 828 (Hexion Specialty Chemicals): a liquid bisphenol A diglycidyl ether-based epoxy resin. Ave. eq. wt.: 189. Viscosity: 13,000 cP at 25° C.

STEPANPOL® AA-220 (Stepan Company): adipic acid-based aliphatic polyester polyol. OH value: 220 mg KOH/g. Functionality: 2.0.

STEPANPOL® PC-101-210 (Stepan Company): aliphatic polyester polyol from ethylene glycol and adipic acid. OH value: 210 mg KOH/g. Functionality: 2.0.

STEPANPOL® PC-102-210 (Stepan Company): aliphatic polyester polyol from 1,4-butanediol glycol and adipic acid. OH value: 210 mg KOH/g. Functionality: 2.0.

STEPANPOL® PC-105-210 (Stepan Company): aliphatic polyester polyol from 1,6-hexanediol and adipic acid. OH value: 210 mg KOH/g. Functionality: 2.0.

STEPANPOL® PC-107-210 (Stepan Company): aliphatic polyester polyol from neopentyl glycol and adipic acid. OH value: 210 mg KOH/g. Functionality: 2.0.

STEPANPOL® PC-1021-210 (Stepan Company): mixed aliphatic/aromatic polyester polyol from 1,4-butanediol, isophthalic acid, and adipic acid. OH value: 210 mg KOH/g. Functionality: 2.0.

STEPANPOL® PC-1040-55 (Stepan Company): aliphatic polyester polyol from ethylene glycol, 1,4-butanediol, and adipic acid. OH value: 56 mg KOH/g. Viscosity: 655 cP at 73° C. Functionality: 2.0.

STEPANPOL® PC-1040-210 (Stepan Company): aliphatic polyester polyol from ethylene glycol, 1,4-butanediol, and adipic acid. OH value: 210 mg KOH/g. Functionality: 2.0.

STEPANPOL® PS-2402 (Stepan Company): aromatic polyester polyol from phthalic anhydride and diethylene glycol. OH value: 234 mg KOH/g. Viscosity: 10,500 cP at 25° C. Functionality: 2.0.

STEPANPOL® PS-3524 (Stepan Company): aromatic polyester polyol from terephthalic acid, phthalic anhydride, diethylene glycol, glycerin, and soybean oil. OH value: 350 mg KOH/g. Viscosity: 7500 cP at 25° C. Functionality: 2.4.

STEPANPOL® PC-1028-210 (Stepan Company): aromatic polyester polyol from 1,6-hexanediol and phthalic anhydride. OH value: 210 mg KOH/g. Functionality: 2.0.

IPA-DEG polyol: aromatic polyester polyol from isophthalic acid and diethylene glycol. OH value: 236 mg KOH/g. Viscosity: 28,200 cP at 25° C. Functionality: 2.0.

IPA-HDO polyol: aromatic polyester polyol from isophthalic acid and 1,6-hexanediol. OH value: 240 mg KOH/g. Functionality: 2.0.

LEECURE® B-610 (Leepoxy Plastics, Inc.): boron trifluoride-based catalyst.

DMP-30 catalyst (Sigma-Aldrich): 2,4,6-tris(dimethylaminomethyl)phenol.

Preparation of IPA-DEG Polyol

Isophthalic acid (652.7 g) and diethylene glycol (688.9 g) are charged to a reaction vessel equipped with mechanical stirring, a temperature probe, a nitrogen inlet, and a packed condenser column having a side-arm condenser. The mixture is heated to 220° C. over about 1 h. Distillate is rapidly removed and the mixture becomes clear. After 8 h, the acid value reaches 13 mg KOH/g. After cooling overnight, heating resumes. When the temperature reaches 200° C., tetrabutoxytitanium (0.36 g) is added. The hydroxyl value is 213 mg KOH/g. Diethylene glycol (31 g) is added, and the mixture is heated to 220° C. until the reaction is deemed complete. Final hydroxyl value (corrected): 236 mg KOH/g.

Preparation of IPA-HDO Polyol

Isophthalic acid (1960 g) and 1,6-hexanediol (2465 g) are charged to a reaction vessel equipped with mechanical stirring, a temperature probe, a nitrogen inlet, and a packed condenser column having a side-arm condenser. The mixture is heated to 220° C. over about 1 h. Distillate is slowly removed and the mixture remains cloudy and white. After cooling overnight, heating resumes to 220° C. for a second and then a third day. At the end of the third day, tetrabutoxytitanium (1.17 g) is added. Hydroxyl value: 242 mg KOH/g.

Preparation of Isocyanate-Modified Polyester-Epoxide Polymers: Ambient Conditions Example 1

STEPANPOL® PS-2402 polyester polyol (48.0 g, product of Stepan Company) is mixed rapidly at room temperature with EPON® 828 resin (28.0 g, product of Hexion Specialty Chemicals), LUPRANATE® M-20 polymeric MDI (20.0 g, product of BASF), and LEECURE® B-610 catalyst (4.0 g, 4.0 wt. %, product of Leepoxy Plastics). The epoxy to isocyanate molar ratio is 1:1. The i-PEEP index is 149. The mixture is clear after a few seconds. Mixing continues for 30 s. The material hardens after about 3.5 min. to give a cured product. Properties of polymers made from this material, including cast elastomers, coatings, and adhesives, appear in Table 1.

Examples 2-20

The procedure of Example 1 is generally followed using EPON® 828 resin, LUPRANATE® M-20 or M10, and the aromatic polyester polyols shown in Table 1 or the aliphatic polyester polyols shown in Table 2. The catalyst level is adjusted to achieve a 3.5 to 4-minute gel time. Properties of the resulting cast elastomers are given in the tables.

Coating and Elastomer Sample Preparation

Each of the reaction products described above is either poured into a mold or is drawn down onto a surface to provide elastomer or coating samples, respectively, for testing. Elastomer samples are produced by pouring about 100 g of reaction mixture into 7"×7"×0.1" molds (ambient conditions, coated with mold release) about 90 s after mixing is initiated. The material is allowed to spread for about 30 s and is then covered. Tongue depressors are positioned at the edges of the mold to provide about 0.07" of venting around the perimeter. Dogbone samples (5.5"×0.5") are cut and conditioned at 25° C. and 50% relative humidity for 12 h prior to physical testing. Molded parts or coatings produced using the low-temperature, Lewis acid-catalyzed process (see Tables 1 and 2) are allowed to cure for at least 5 days at room temperature prior to testing. Molded parts or coatings produced using the DMP-30 amine catalyst (Table 3) are post-cured at 50° C. to 70° C. for at least 2 hours prior to testing.

Mechanical Properties

A universal testing machine (MTS ReNew™ system) and TestWorks® 4.11 software are used for sample testing and analysis. The central test portion of the dogbone samples is 0.5" wide and 1.65" long. Samples are placed in grips spaced 2.25" apart. A 1000 lb. load cell is used to measure properties at a tensile pull rate of 2"/min until sample breakage. Tensile strength, modulus, elongation-at-break, and total energy absorbed are measured at least in duplicate and averaged.

Total energy absorbed ("T. E. A.") is calculated by the universal testing machine software (Testworks 4.11) and obtained by normalizing the area under the stress-strain curve by the surface area of the central test portion (tapered portion) of the dogbone sample. The area under the stress-strain curve is calculated from the product of the total force (pounds) required to produce extension of the sample up to breakage (inches). For each sample, the surface area is 0.825 in.$^2$. Total energy absorbed is a measurement that allows for comparison of the relative toughness of each sample tested. The units of T. E. A. are lb·in./in.$^2$.

Hardness

Hardness of cured i-PEEP samples is determined using a Type A durometer (Pacific Transducer, Model 306L) according to ASTM 2240-85. The dogbone samples described earlier are used.

Glass-Transition Temperature

Glass-transition temperatures ($T_g$) are determined using a TA Instruments Discovery Series differential scanning calorimeter and Trios (V3.2) software from TA Instruments. Samples are prepared by trimming a 10-20 mg piece from the dogbone samples used for mechanical property testing. The sample is accurately weighed, crimped in the test pan, and placed in the sample holder of the instrument along with a reference pan. The sample is cooled to −50° C. and then warmed from −50° C. to 150° C. at 5° C. per minute. The i-PEEP samples typically exhibit a strong $T_g$ signal with a midpoint within the range of −30° C. to 35° C.

Coating Property Testing

Taber abrasion testing is performed in accord with ASTM D 4060 using a 5139 Taber Industries abraser. Separate experiments using the finer Calibrase® CS-17 and the coarser Calibrase® H-18 abrasion test wheels (Taber Industries) are performed for certain samples. The wheels are pressed to the surface with a 1000-g weight. Samples are measured for weight loss after 1000 cycles.

Impact resistance tests are performed with thin coatings on chromate/phosphate-treated steel (ACT test panels). The 4"×6" coupons are carefully coated using a #200 drawdown bar (BYK Co.). Lewis acid-catalyzed samples (see Tables 1 and 2) are placed on a flat surface for at least 5 days at ambient conditions to cure; the DMP-30 catalyzed samples (Table 3) are placed on a flat surface in the oven for at least 2 h at 60° C. to cure. After curing, the coated coupons are kept at ambient conditions for an additional week prior to testing.

Impact strength is determined using a Gardner impact tester (from BYK). Using the 4-lb. projectile, coated steel samples are subjected to varying impact forces based on the height of projectile release. Impact strength (pounds per inch) is the force required to cause visual coating damage. Measurements are performed for direct impact (coated side impact) and indirect impact (impact on the opposite side of the coating).

Adhesive Preparation and Testing

The procedure of ASTM D-1002 is generally followed. Test samples are prepared and cured at ambient temperature using 1 in.×4 in.×0.063 in. cold rolled steel (CRS) 0-Panel® test substrates (Q-Lab Corp.) as supplied. The i-PEEP system (100 g) is stirred in an open cup for 30 seconds. After about 1 minute, the reacting liquid material is dabbed onto a one-inch section at the end of one of the CRS test coupons. A second test coupon is placed on top of the first coupon to forming a 1-in$^2$ overlap section sandwiching the reacting liquid adhesive. A binder clip is affixed across the overlap area, and excess adhesive is removed. The assembly cures at ambient conditions on a flat surface for at least 5 days prior to lap shear strength testing.

Lap shear strength is measured using an Instron universal testing machine (MTS ReNew™ system) and TestWorks® 4.11 software. The binder clip is removed and the non-adhered ends of the metal coupon strips are secured in Instron 30 kN metal test grips (model #2716-015) affixed to the testing apparatus. The assembly is then pulled in the tensile direction at 0.05 in/min until overlap bond failure occurs. The peak stress at failure is measured in duplicate and averaged for each i-PEEP system.

Results from Lewis Acid-Catalyzed, Low-Temperature Process

Isocyanate-Modified Polyester-Epoxide Polymers from Aromatic Polyester Polyols

Table 1 shows i-PEEP compositions prepared from various commercial and lab-produced aromatic polyester polyols, polymeric MDI, and EPON® 828 resin. The table also shows properties of cast elastomers, coatings and adhesives produced using the i-PEEP compositions.

Compared with a typical epoxy system, the i-PEEP compositions based on aromatic polyester polyols give similarly hard elastomers (Shore A hardness 94-96) that have lower Tg (<50° C.), high modulus (100-200 kpsi), increased total energy absorption (10-50 lb.in.in$^2$), and modestly higher ultimate elongation (3-10%). Coatings from these i-PEEP compositions show superior Taber abrasion (<25 mg with 1000 cycles of wheel CS-17 at 1-kg load). The compositions based on aromatic polyester polyols generally have relatively low impact resistance, although the compositions produced from STEPANPOL® PC-1028-210 (Examples 7 and 8) are a notable exception in this regard. As shown in Table 1, the i-PEEP compositions made using LUPRANATE® M-10 (average NCO functionality: 2.3) have somewhat greater tensile strength when compared with similar i-PEEP compositions made with LUPRANATE® M-20 (average NCO functionality: 2.7). Most of these formulations provide relatively good adhesive properties, with lap shear values on cold-rolled steel generally within the range of 1000 to 2500 psi. From these screening examples, it is apparent that opportunities abound to fine tune the formulations to achieve desired properties.

Isocyanate-Modified Polyester-Epoxide Polymers from Aliphatic and Mixed Aliphatic/Aromatic Polyester Polyols Table 2 shows i-PEEP compositions prepared from various commercial and lab-produced aliphatic or mixed aliphatic/aromatic polyester polyols, polymeric MDI, and EPON® 828 resin. The table also shows properties of cast elastomers, coatings, and adhesives produced using the i-PEEP compositions.

In these examples, the i-PEEP index is relatively high (165-170). Compared with the i-PEEP products from aromatic polyester polyols (Table 1), these compositions have lower stiffness (modulus values well below 100 kpsi), much higher ultimate elongations (20-200%), higher total energy absorption (40-220 lb.in./in.$^2$), and much better direct and indirect impact resistance (>160 lb./in). The aliphatic diacid content is helpful for increasing the flexibility of the products.

Amine-Catalyzed, Room-Temperature Preparation of i-PEEP Compositions

Isocyanate-modified polyester-epoxide compositions can be made under ambient conditions in the presence of an amine catalyst (e.g., "DMP-30," which is 2,4,6-tris-(dimethylaminomethyl)phenol). These compositions are post-cured prior to testing.

Example 21

In a typical example, EPON® 828 resin (40.0 g, 0.208 eq.) is hand-stirred with STEPANPOL® PS-2402 (62.3 g, 0.26 eq.), LUPRANATE® M-10 (6.87 g, 0.052 eq.), and DMP-30 catalyst (3.0 g) for 1 minute in a paper cup. The mixture becomes clear after a few seconds of mixing. The reaction product is placed in an oven at 60° C. for 2 h to post-cure. Properties of dogbone samples cut from this polymer appear in Table 3.

Examples 22-27

The procedure of Example 21 is generally followed using various polyester polyols or polyol blends. The i-PEEP index is 100 or 180. The epoxy to isocyanate molar ratio is varied between 60/40 and 80/20. Results of testing the resulting elastomer samples appear in Table 3.

In general, the results in Table 3 illustrate the wide variety of properties available from different i-PEEP compositions.

Compared with the results in Tables 1 and 2, the results suggest a preference for using a Lewis acid rather than a base catalyst for a low-temperature process.

From the screening examples in Tables 1-3, it is apparent that formulators will be able to balance the hardness and stiffness properties of i-PEEP systems based on aromatic polyester polyols by incorporating some proportion of aliphatic diacid content into the polyester polyol or by blending aromatic and aliphatic polyester polyols.

Comparison with Two-Step Processes:

In processes of the invention, a polyepoxide compound, a polyisocyanate, and a polyester polyol are reacted in a single step, either at low temperature (0° C. to 40° C.) in the presence of a catalyst, or at elevated temperature (40° C. to 100° C.), optionally in the presence of a catalyst. We found that the one-step process delivers coatings, elastomers, and other products having desirable properties. On the other hand, a stepwise process in which the polyester polyol is reacted first with the polyisocyanate to give a prepolymer, followed by reaction of the prepolymer with the polyepoxide in proportions according to the present invention fails to provide an acceptable product. Similarly, a stepwise process in which the polyester polyol is reacted first with the polyepoxide in proportions according to the present invention, followed by reaction of the polyester-epoxide product with the polyisocyanate also fails to provide an acceptable product. Some illustrations follow.

The single-step process used for Formulation Example 7 provides an isocyanate-modified polyester-epoxide polymer useful as an impact-resistant coating, an elastomer with high stiffness and tensile strength, or an adhesive having good lap shear strength.

Comparative Example A1

Formulation Example 7 is repeated except that the polyester polyol, STEPANPOL® PC-1028-210, is first reacted with LUPRANATE® M-20 to give a prepolymer. After 30 s of mixing at room temperature followed by allowing the mixture to stand for 0.5 h, the prepolymer is either a solid or is too viscous to be combined with the EPON® 828 resin at room temperature in the presence of a Lewis acid catalyst. Thus, the product of Example 7, which is made in one step, is not accessible using this stepwise process.

Comparative Example A2

Formulation Example 7 is repeated except that the polyester polyol, STEPANPOL® PC-1028-210, is first reacted with the EPON® 828 resin in the presence of 4% LEECURE® B-610 catalyst at room temperature to give a polyester-epoxide reaction product. The polyester-epoxide reaction product solidifies within 15 min., so it is not possible to further react this material with LUPRANATE® M-20. Thus, the product of Example 7 is not accessible using this alternative stepwise process.

The single-step process used for Formulation Example 2 provides an isocyanate-modified polyester-epoxide polymer useful for producing an elastomer with high stiffness and tensile strength.

Comparative Example B1

Formulation Example 2 is repeated except that the polyester polyol, STEPANPOL® PS-2402, is first reacted with LUPRANATE® M-10 to give a prepolymer. After 30 s of mixing at room temperature followed by allowing the mixture to stand for 0.5 h, the prepolymer is either a solid or is too viscous to be combined with the EPON® 828 resin at room temperature in the presence of a Lewis acid catalyst. Thus, the product of Example 2, which is made in one step, is not accessible using this stepwise process.

Comparative Example B2

Formulation Example 2 is repeated except that the polyester polyol, STEPANPOL® PS-2402, is first reacted with the EPON® 828 resin in the presence of 4% LEECURE® B-610 catalyst at room temperature to give a polyester-epoxide reaction product. The polyester-epoxide reaction product solidifies within 15 min., so it is not possible to further react this material with LUPRANATE® M-10. Thus, the product of Example 2 is not accessible using this alternative stepwise process.

The single-step process used for Formulation Example 18 provides an isocyanate-modified polyester-epoxide polymer useful for producing an elastomer with good impact resistance, high elongation, and high total energy absorption.

Comparative Example C1

Formulation Example 18 is repeated except that the polyester polyol, STEPANPOL® PC-1021-210, is first reacted with LUPRANATE® M-10 to give a prepolymer. After 30 s of mixing at room temperature followed by allowing the mixture to stand for 0.5 h, the prepolymer is either a solid or is too viscous to be combined with the EPON® 828 resin at room temperature in the presence of a Lewis acid catalyst. Thus, the product of Example 18, which is made in one step, is not accessible using this stepwise process.

Comparative Example C2

Formulation Example 18 is repeated except that the polyester polyol, STEPANPOL® PC-1021-210, is first reacted with the EPON® 828 resin in the presence of 4% LEECURE® B-610 catalyst at room temperature to give a polyester-epoxide reaction product. The polyester-epoxide reaction product solidifies within 15 min., so it is not possible to further react this material with LUPRANATE® M-10. Thus, the product of Example 18 is not accessible using this alternative stepwise process.

The single-step process used for Formulation Example 19 provides an isocyanate-modified polyester-epoxide polymer useful for producing an elastomer with good impact resistance and excellent abrasion resistance.

Comparative Example D1

Formulation Example 19 is repeated except that the polyester polyol, STEPANPOL® PC-1040-210, is first reacted with LUPRANATE® M-20 to give a prepolymer. After 30 s of mixing at room temperature followed by allowing the mixture to stand for 0.5 h, the prepolymer is either a solid or is too viscous to be combined with the EPON® 828 resin at room temperature in the presence of a Lewis acid catalyst. Thus, the product of Example 19, which is made in one step, is not accessible using this stepwise process.

Comparative Example D2

Formulation Example 19 is repeated except that the polyester polyol, STEPANPOL® PC-1040-210, is first reacted with the EPON® 828 resin in the presence of 4% LEECURE® B-610 catalyst at room temperature to give a polyester-epoxide reaction product. The polyester-epoxide reaction product solidifies within 15 min., so it is not possible to further react this material with LUPRANATE® M-20. Thus, the product of Example 19 is not accessible using this alternative stepwise process.

TABLE 1

Products from Isocyanate-Modified Polyester-Epoxide Polymers: Aromatic Polyester Polyols
Low-Temperature Process, Lewis Acid Catalyst, Room Temperature Post-Cure

| Example | 1 | 2 | 3 | 4 | 5 | 6 | 7 | 8 | 9 | 10 |
|---|---|---|---|---|---|---|---|---|---|---|
| i-PEEP composition | | | | | | | | | | |
| Polyol[1] | PS-2402 | PS-2402 | PS-3524 | PS-3524 | | | PC-1028-210 | PC-1028-210 | | |
| Components[2] | DEG/PA | DEG/PA | aromatic | aromatic | DEG/IPA | DEG/IPA | HDO/PA | HDO/PA | HDO/IPA | HDO/IPA |
| OH val. (mg KOH/g) | 240 | 240 | 350 | 350 | 236 | 236 | 210 | 210 | 242 | 242 |
| Epoxy compound[3] | EPON® 828 | EPON® 828 | EPON® 828 | EPON® 828 | EPON® 828 | EPON® 828 | EPON® 828 | EPON® 828 | EPON® 828 | EPON® 828 |
| Polyisocyanate[4] | M20 | M10 | M20 | M10 | M20 | M10 | M20 | M10 | M20 | M10 |
| i-PEEP index | 149 | 147 | 100 | 100 | 147 | 148 | 161 | 159 | 144 | 144 |
| Cast elastomers | | | | | | | | | | |
| Shore A hardness | 96 | 96 | 93 | 95 | 95 | 95 | 95 | 95 | 94 | 96 |
| Tensile str. (psi) | 4924 | 7117 | 4994 | 6250 | 6956 | 7720 | 6109 | 7448 | 5171 | 6903 |
| Modulus (kpsi) | 163.8 | 160.3 | 148.9 | 159.7 | 153.5 | 143.9 | 123.5 | 140.8 | 109.6 | 124.4 |
| Elong. at break (%) | 3.7 | 6.2 | 4.7 | 5.0 | 5.2 | 7.1 | 7.1 | 7.3 | 10.0 | 8.0 |
| TEA[5] (lb · in./in.²) | 13.1 | 28.5 | 12.2 | 18.5 | 26.5 | 37.8 | 32.7 | 39.8 | 47.0 | 38.1 |
| Tg (° C.) | 24.7 | 27.0 | 21.0 | 22.6 | 23.3 | — | 21.7 | 30.6 | 31.9 | — |

TABLE 1-continued

Products from Isocyanate-Modified Polyester-Epoxide Polymers: Aromatic Polyester Polyols
Low-Temperature Process, Lewis Acid Catalyst, Room Temperature Post-Cure

| Example | 1 | 2 | 3 | 4 | 5 | 6 | 7 | 8 | 9 | 10 |
|---|---|---|---|---|---|---|---|---|---|---|
| Adhesives | | | | | | | | | | |
| CRS lap shear (psi) | 1143 | 1654 | 1050 | 940 | 1266 | 1129 | 2365 | 2048 | 1777 | 1782 |
| Coatings | | | | | | | | | | |
| D/I impact (lb/in) | <20, <20 | <20, <20 | <20, <20 | <20, <20 | <20, <20 | <20, <20 | >160, >160 | >160, >160 | 40, <20 | <20, <20 |
| Taber abrasion[6], mg | 21 | 6 | 18 | 14 | 19 | — | 10 | — | 13 | — |

[1]STEPANPOL ® PS-2402, STEPANPOL ® PS-3524, and STEPANPOL ® PC 1028-210 are aromatic polyester polyols, products of Stepan Company.
[2]PA = phthalic anhydride; DEG = diethylene glycol; IPA = isophthalic acid; HDO = 1,6-hexanediol.
[3]EPON ® 828, product of Hexion Specialty Chemicals.
[4]LUPRANATE ® M10 and LUPRANATE ® M20 are polymeric MDI, products of BASF.
[5]Total energy absorbed.
[6]CS-17, 1000 cycles, 1-kg load.

TABLE 2

Products from Isocyanate-Modified Polyester-Epoxide Polymers: Aliphatic Polyester Polyols
Low-Temperature Process, Lewis Acid Catalyst, Room Temperature Post-Cure

| Example | 11 | 12 | 13 | 14 | 15 | 16 | 17 | 18 | 19 | 20 |
|---|---|---|---|---|---|---|---|---|---|---|
| i-PEEP composition | | | | | | | | | | |
| Polyol[1] | PC-101-210 | PC-102-210 | PC-105-210 | PC-105-210 | PC-107-210 | PC-107-210 | PC-1021-210 | PC-1021-210 | PC-1040-210 | PC-1040-210 |
| Components[2] | EG/AA | BDO/AA | HDO/AA | HDO/AA | NPG/AA | NPG/AA | BDO/IPA/AA* | BDO/IPA/AA* | BDO/EG/AA | BDO/EG/AA |
| OH val. (mg KOH/g) | 210 | 210 | 210 | 210 | 210 | 210 | 210 | 210 | 210 | 210 |
| Epoxy compound[3] | EPON ® 828 | EPON ® 828 | EPON ® 828 | EPON ® 828 | EPON ® 828 | EPON ® 828 | EPON ® 828 | EPON ® 828 | EPON ® 828 | EPON ® 828 |
| Polyisocyanate[4] | M10 | M10 | M20 | M10 | M20 | M10 | M20 | M10 | M20 | M10 |
| i-PEEP index | 167 | 170 | 167 | 168 | 166 | 167 | 168 | 166 | 169 | 169 |
| Cast elastomers | | | | | | | | | | |
| Shore A hardness | 96 | 95 | 91 | 94 | 96 | 94 | 95 | 94 | 90 | 91 |
| Tensile str. (psi) | 2489 | 2441 | 1355 | 1725 | 2200 | 3384 | 2258 | 1816 | 861 | 1080 |
| Modulus (psi) | 28,100 | 12,200 | 1,860 | 11,100 | 72,700 | 86,500 | 16,000 | 2,460 | 1,790 | 2,210 |
| Elong. at break (%) | 88 | 97 | 108 | 74 | 72 | 19 | 129 | 187 | 82 | 89 |
| TEA[5] (lb · in./in.$^2$) | 164 | 160 | 93 | 95 | 169 | 60 | 207 | 221 | 44 | 51 |
| Tg (° C.) | 22.5 | 19.8 | 6.4 | 19.6 | 24.5 | — | 20.0 | 18.3 | 10.4 | 15.1 |
| Adhesives | | | | | | | | | | |
| CRS lap shear (psi) | 757 | 1183 | 1432 | 1715 | 1653 | 2277 | 412 | 839 | 144 | 300 |
| Coatings | | | | | | | | | | |
| D/I impact (lb/in) | >160, >160 | >160, >160 | >160, >160 | >160, >160 | >160, >160 | >160, >160 | >160, >160 | >160, >160 | >160, >160 | >160, >160 |
| Taber abrasion[6], mg | 0.6 | — | 0.3 | — | 5 | — | 0.6 | — | 0.3 | — |

[1]STEPANPOL ® PC-101-210, STEPANPOL ® PC-102-210, STEPANPOL ® PC 105-210, STEPANPOL ® PC 107-210, and STEPANPOL ® PC 1040-210 are aliphatic polyester polyols, products of Stepan Company. STEPANPOL 1021-210 is an aliphatic/aromatic polyester polyol from Stepan.
[2]EG = ethylene glycol; BDO = 1,4-butanediol; HDO = 1,6-hexanediol; NPG = neopentyl glycol; IPA = isophthalic acid; AA = adipic acid.
[3]EPON ® 828, product of Hexion Specialty Chemicals.
[4]LUPRANATE ® M10 and LUPRANATE ® M20 are polymeric MDI, products of BASF.
[5]Total energy absorbed.
[6]CS-17, 1000 cycles, 1-kg load.
*Mixed aliphatic/aromatic polyester polyol.

TABLE 3

Products from Isocyanate-Modified Polyester-Epoxide Polymers
Low-Temperature Process, Amine Catalyst, with Post-Cure (60° C., 2 h)

| Example | 21 | 22 | 23 | 24 | 25 | 26 | 27 |
|---|---|---|---|---|---|---|---|
| i-PEEP composition | | | | | | | |
| Polyol[1] | PS-2402 | PS-2402 | AA-220 | PS-2402 PC-1040-55 | PS-2402 PC-1040-55 | PS-2402 PC-1040-55 | PS-2402 PC-1040-55 |
| Components[2] | DEG/PA | DEG/PA | DEG/AA | DEG/PA EG/BDO/AA | DEG/PA EG/BDO/AA | DEG/PA EG/BDO/AA | DEG/PA EG/BDO/AA |
| OH val. (mg KOH/g) | 240 | 240 | 220 | 240, 56 | 240, 56 | 240, 56 | 240, 56 |
| Epoxy compound[3] | EPON ® 828 | EPON ® 828 | EPON ® 828 | EPON ® 828 | EPON ® 828 | EPON ® 828 | EPON ® 828 |
| Polyisocyanate[4] | M10 | M20 | M20 | M20 | M20 | M20 | M20 |
| i-PEEP index | 100 | 100 | 100 | 180 | 180 | 180 | 180 |
| Epoxy/isocyanate (mol/mol) | 80/20 | 80/20 | 80/20 | 80/20 | 60/40 | 70/30 | 70/30 |
| DMP-30 catalyst[5] (g) | 3.0 | 3.0 | 3.0 | 3.0 | 1.0 | 1.0 | 3.0 |
| Cast elastomers | | | | | | | |
| Shore A hardness | — | 83 | 30 | 68 | — | 40 | 74 |
| Tensile str. (psi) | 1104 | 686 | 41 | 584 | 80 | 144 | 913 |
| Modulus (psi) | 22,300 | 7,900 | 100 | 1,580 | 62 | 150 | 5,700 |
| Elong. at break (%) | 80 | 93 | 39 | 102 | 215 | 158 | 75 |
| TEA[6] (lb · in./in.²) | 72 | 47 | 0.74 | 38 | 13 | 11 | 53 |
| Tg (° C.) | −1.0 | 4.5 | −25 | −10 | −12 | — | −14 |

[1]STEPANPOL ® PS-2402 is an aromatic polyester polyol; STEPANPOL ® PC 1040-55 and STEPANPOL ® AA-220 are aliphatic polyester polyols; all are products of Stepan Company.
[2]DEG = diethylene glycol; EG = ethylene glycol; BDO = 1,4-butanediol; PA = phthalic anhydride; AA = adipic acid.
[3]EPON ® 828, product of Hexion Specialty Chemicals.
[4]LUPRANATE ® M10 and LUPRANATE ® M20 are polymeric MDI, products of BASF.
[5]DMP-30 is 2,4,6-tris(dimethylaminomethyl)phenol.
[6]Total energy absorbed. Polyol mixtures are 50/50 blends based on molar equivalents.

The preceding examples are meant only as illustrations; the following claims define the inventive subject matter.

We claim:

1. An isocyanate-modified polyester-epoxide polymer (i-PEEP) composition which comprises a reaction product of:
   (a) a polyepoxide compound having an equivalent weight within the range of 125 to 250 g/eq;
   (b) a polyol composition comprising a polyester polyol, wherein the polyester polyol has a hydroxyl value within the range of 50 to 400 mg KOH/g, an average hydroxyl functionality within the range of 1.5 to 4.0, and an acid number less than 5 mg KOH/g; and
   (c) a polyisocyanate having an average NCO functionality within the range of 2.0 to 3.0;
   wherein the ratio of epoxy equivalents of the polyepoxide compound to hydroxyl equivalents of the polyol composition is within the range of 0.2 to 2, the i-PEEP index is within the range of 100 to 200; and the i-PEEP composition has a glass-transition temperature as measured by differential scanning calorimetry within the range of −30° C. to 35° C.

2. The i-PEEP composition of claim 1 wherein the polyepoxide compound is an aromatic polyepoxide.

3. The i-PEEP composition of claim 2 wherein the aromatic polyepoxide is a reaction product of a bisphenol and epichlorohydrin having an equivalent weight within the range of 185 to 200 g/eq.

4. The i-PEEP composition of claim 1 wherein the polyol composition comprises an aromatic polyester polyol.

5. The i-PEEP composition of claim 1 wherein the polyester polyol has a hydroxyl value within the range of 60 to 350 mg KOH/g and an average hydroxyl functionality within the range of 1.8 to 3.5.

6. The i-PEEP composition of claim 1 wherein the polyisocyanate is an aromatic polyisocyanate.

7. The i-PEEP composition of claim 1 having a glass-transition temperature within the range of −5° C. to 30° C.

8. The i-PEEP composition of claim 1 wherein the polyepoxide compound, the polyisocyanate, and the polyol composition are combined at an i-PEEP index within the range of 125 to 165.

9. The i-PEEP composition of claim 1 wherein the polyester polyol is an aromatic polyester polyol and the i-PEEP composition has an elongation at break by ASTM D412, Method A of at least 5%.

10. The i-PEEP composition of claim 1 wherein the polyester polyol comprises recurring units of an aliphatic dicarboxylic acid and the i-PEEP composition has an elongation at break by ASTM D412, Method A of at least 70%.

11. A coating comprising the i-PEEP composition of claim 1.

12. The coating of claim 11 wherein the polyester polyol comprises recurring units of an aliphatic dicarboxylic acid and the coating has direct and indirect impact resistance values of at least 160 lbs/in.

13. An elastomer or a microcellular elastomer comprising the i-PEEP composition of claim 1.

14. The elastomer or microcellular elastomer of claim 13 wherein the polyester polyol is an aromatic polyester polyol and the elastomer has a Shore A hardness of at least 90, a peak tensile stress of at least 4,000 psi, and a modulus of at least 100,000 psi.

15. An adhesive or sealant comprising the i-PEEP composition of claim 1.

16. A process which comprises reacting at a temperature within the range of 0° C. to 40° C. in the presence of a catalyst a mixture comprising a polyepoxide compound having an equivalent weight within the range of 125 to 250 g/eq, a polyisocyanate, and a polyol composition comprising a polyester polyol, wherein the polyester polyol has a hydroxyl value within the range of 50 to 400 mg KOH/g, an average hydroxyl functionality within the range of 1.5 to 4.0, and an acid number less than 5 mg KOH/g, wherein the ratio of epoxy equivalents of the polyepoxide compound to hydroxyl equivalents of the polyol composition is within the range of 0.2 to 2 and the i-PEEP index is within the range of 100 to 200 to produce an isocyanate-modified polyester-epoxide polymer (i-PEEP) composition having a glass-transition temperature as measured by differential scanning calorimetry within the range of −30° C. to 35° C.

17. The process of claim 16 wherein the reaction is performed at room temperature.

18. The process of claim 16 wherein the catalyst comprises a Lewis acid compound.

19. The process of claim 18 wherein the catalyst comprises a complex of boron trifluoride with an amine, an ether, an alcohol, a polyol, or a combination thereof.

20. The process of claim 16 wherein the catalyst is a base, and the i-PEEP composition is post-cured by heating at a temperature within the range of 50° C. to 150° C.

21. A process which comprises heating, at a temperature within the range of 40° C. to 100° C., optionally in the presence of a catalyst, a mixture comprising a polyepoxide compound having an equivalent weight within the range of 125 to 250 g/eq, a polyisocyanate, and a polyol composition comprising a polyester polyol, wherein the polyester polyol has a hydroxyl value within the range of 50 to 400 mg KOH/g, an average hydroxyl functionality within the range of 1.5 to 4.0, and an acid number less than 5 mg KOH/g, wherein the ratio of epoxy equivalents of the polyepoxide compound to hydroxyl equivalents of the polyol composition is within the range of 0.2 to 2 and the i-PEEP index is within the range of 100 to 200 to produce an isocyanate-modified polyester-epoxide polymer (i-PEEP) composition having a glass-transition temperature as measured by differential scanning calorimetry within the range of −30° C. to 35° C.

22. The process of claim 21 wherein the mixture comprising the polyepoxide compound, polyol composition, and polyisocyanate is heated at a temperature within the range of 60° C. to 90° C.

23. The process of claim 21 wherein the heating is performed in the presence of a catalyst comprising a Lewis acid compound.

24. The process of claim 23 wherein the catalyst comprises a complex of boron trifluoride with an amine, an ether, an alcohol, a polyol, or a combination thereof.

25. The process of claim 21 wherein the heating is performed in the presence of a base catalyst, and the i-PEEP composition is post-cured by heating at a temperature within the range of 50° C. to 150° C.

* * * * *